(12) United States Patent  
Nicholson

(10) Patent No.: US 6,724,308 B2  
(45) Date of Patent: Apr. 20, 2004

(54) RFID TRACKING METHOD AND SYSTEM

(75) Inventor: Mark R. Nicholson, Scotts Valley, CA (US)

(73) Assignee: Escort Memory Systems, Scotts Valley, CA (US)

( * ) Notice: Subject to any disclaimer, the term of this patent is extended or adjusted under 35 U.S.C. 154(b) by 73 days.

(21) Appl. No.: 09/927,795

(22) Filed: Aug. 9, 2001

(65) Prior Publication Data

US 2002/0130778 A1 Sep. 19, 2002

Related U.S. Application Data

(63) Continuation-in-part of application No. 09/925,129, filed on Aug. 8, 2001, now Pat. No. 6,445,297, and a continuation-in-part of application No. 09/925,228, filed on Aug. 8, 2001, and a continuation-in-part of application No. 09/925,229, filed on Aug. 8, 2001, now Pat. No. 6,563,425.

(60) Provisional application No. 60/239,975, filed on Oct. 10, 2000, provisional application No. 60/224,932, filed on Aug. 11, 2000, and provisional application No. 60/224,855, filed on Aug. 11, 2000.

(51) Int. Cl.[7] ............................................. G08B 13/14
(52) U.S. Cl. ................. 340/572.1; 340/572.4; 340/572.7; 340/572.8; 340/10.1
(58) Field of Search ................ 340/572.1–572.8, 340/568.1, 571, 10.1, 5.92; 235/385

(56) References Cited

U.S. PATENT DOCUMENTS

| 4,663,625 | A | * | 5/1987 | Yewen ...................... 340/10.1 |
| 5,572,226 | A | | 11/1996 | Tuttle |
| 5,745,036 | A | * | 4/1998 | Clare ...................... 340/572.1 |
| 5,822,714 | A | * | 10/1998 | Cato ......................... 702/108 |
| 5,929,760 | A | * | 7/1999 | Monahan ................. 340/572.7 |
| 5,929,779 | A | * | 7/1999 | MacLellan et al. ........ 340/10.1 |
| 5,959,531 | A | * | 9/1999 | Gallagher, III et al. .. 340/572.1 |
| 6,094,173 | A | * | 7/2000 | Nylander ................... 343/742 |
| 6,204,764 | B1 | | 3/2001 | Maloney |
| 6,285,342 | B1 | * | 9/2001 | Brady et al. ............... 343/895 |

* cited by examiner

Primary Examiner—Toan Pham  
(74) Attorney, Agent, or Firm—Francis Law Group

(57) ABSTRACT

A method for using multi-functional RFID tag assemblies, passive repeater systems and modular antenna systems. One embodiment comprises a method for communicating with an RFID tag by providing a passive loop modular antenna system, moving the RFID tag through a field related to the modular antenna system and transmitting energy through the antenna to communicate with the RFID tag. In a further embodiment, the RFID tag includes a passive loop in proximity with the RFID tag to improve the signals received and transmitted by the tag. In another embodiment, the RFID tag is removeably attached to a product container having a product therein and adapted to be removed from the container and re-attached to the product or a second container.

20 Claims, 15 Drawing Sheets

RFID TRACKING METHOD AND SYSTEM

CROSS REFERENCE TO RELATED APPLICATIONS

This invention is a continuation-in-part of U.S. application Ser. No. 09/925,129, filed Aug. 8, 2001, now U.S. Pat. No. 6,445,297 B1, which claims benefit under 35 U.S.C. 119 (e) of U.S. Provisional Application No. 60/239,975, filed Oct. 10, 2000; U.S. application Ser. No. 09/925,228, filed Aug. 8, 2001, which claims benefit under 35 U.S.C. 119 (e) of U.S. Provisional Application No. 60/224,932, filed Aug. 11, 2000; and application Ser. No. 09/925,229, filed Aug. 8, 2001, now U.S. Pat. No. 6,563,425 B2, which claims benefit under 35 U.S.C. 119 (e) of U.S. Provisional Application No. 60/224,855, filed Aug. 11, 2000, each of which is incorporated in its entirety by reference.

FIELD OF THE INVENTION

The present invention relates in general to radio frequency identification (RFID) devices. More particularly, the invention relates to the use of multi-functional RFID tag assemblies, passive repeater systems and modular antenna systems to track containers and/or products.

BACKGROUND OF THE INVENTION

RFID systems are well known in the art. Such systems include relatively large packages containing battery powered transmission/receiving circuitry, such as the identification system disclosed in U.S. Pat. No. 4,274,083, to passive systems in which the transponder receives its power from the base station or interrogator, such as the identification system disclosed in U.S. Pat. No. 4,654,658.

A typical RFID system is made up of reusable tags, an antenna system that interrogates the tags via an RF link and a controller. The host (or computer) system interfaces with the controller and directs the interrogation of the tags. The RFID system thus provides effective means of identifying, monitoring, and controlling materials in a closed loop process. In a factory environment, the tags are employed as the transport mechanism between "islands of automation," providing a record of each process which can be acted upon immediately or downloaded later for analysis. In operation, as a tag passes near an RFID antenna unit, an antenna emits RF signals towards the tag and the tag transmits responses to the antenna. The tags can be powered by an internal battery (i.e., an "active" tag) or by inductive coupling receiving induced power from the RF signals emitted from the antenna (i.e., a "passive" tag). Passive tags have zero maintenance and virtually unlimited life. The life span of an active tag is, however, limited by the lifetime of the battery, although some tags offer replaceable batteries. RFID tags also have limited applicability due to limitations on the operating range.

RFID antenna units are typically employed in manufacturing environments and are used to read tagged items as they pass certain points. The antennas are generally operated in the ranges of 2.45 GHz, 900 MHz or 125 KHz. The noted frequencies are employed to achieve a longer antenna field range. It is, however, well known that at 2.45 GHz and 900 MHz the fields produced by the antenna(s) are affected by virtually everything that passes through the field, including metals and moisture. Metal causes extreme reflection of the fields, while moisture causes extreme absorption of the field. Therefore, any metal object or anything containing moisture, such as the human body, will cause extreme disruption of the field and, hence, the communication of the antenna with the tags.

In an effort to eliminate or substantially reduce the extreme reflection cause by metal objects passing through the field, multiple reflective shields have been employed. The shields cause the field to continuously reflect until it eventually contacts a tag. This is, however, a costly and often impractical solution.

At the other extreme (i.e., 125 KHz), better environmental performance is achieved because metal and moisture generally have less affect on the field. There are, however, several significant drawbacks associated with the noted operating frequency. A major drawback is the high cost, since 100 or more turns in the antenna coil are required to achieve the 125 KHz operating range. Alternatively, an operating frequency of 13.56 MHz can be employed. Although the noted frequency achieves good environmental performance, it is often unable to achieve the operating range of the aforementioned frequencies.

It is therefore an object of the present invention to utilize an RFID antenna system that comprises modular antenna segments that can be connected in a variety of configurations for multiple applications.

It is therefore an object of the present invention to utilize an RFID tag assembly and system to track a product or other article during transportation, storage and distribution.

It is another object of the invention to utilize an RFID tag assembly and system to extend the operating range of a conventional RFID tag.

It is yet another object of the invention to utilize an RFID tag assembly and system to reduce the orientation sensitivity of a conventional RFID tag.

It is still a further object of the invention to utilize cartons having integrated RFID tags to track and identify items during transportation, storage and distribution.

SUMMARY OF THE INVENTION

In accordance with the above objects and those that will be mentioned and will become apparent below, the invention comprises a method for communicating with an RFID tag comprising the steps of (i) providing a passive loop modular antenna system, the antenna system comprising a plurality of modular antenna segments adapted to transmit at least a first RF signal to the RFID tag and receive at least a second RF signal from the RFID tag, the antenna segments being removeably connectable to form a plurality of antenna system configurations, at least a first of the plurality of antenna system configurations providing an antenna field, the antenna field providing substantially multi-directional RF transmission of the first RF signal and receipt of the second RF signal, (ii) moving the RFID tag through the antenna field, (iii) transmitting the first RF signal from the antenna system while the RFID tag is moved through the antenna field, and (iv) receiving the second RF signal from the RFID tag.

Preferably, the noted method includes the step of providing configuration means having at least design means for designing at least a first one of the plurality of antenna system configurations, design validation means to validate the design of the first antenna system configuration, and means for providing at least one assembly drawing and the control parameters for the first antenna system configuration.

In a further embodiment of the invention, the method for communicating with at least one RFID tag comprises the steps of (i) providing a RFID reader adapted to provide a magnetic flux field, (ii) providing at least one RFID tag that is disposed on at least a first product container, (iii) providing at least one passive repeater member having at least one substantially continuous passive loop that is adapted and positionable with respect to the RFID reader and tag to couple the RFID reader and tag and redirect the magnetic flux field, (iv) providing the magnetic flux field, and (v) moving the first product container through the magnetic flux field.

Preferably, the RFID tag is removeably attached to the first product container and is adapted to be removed from the first product container and re-attached to at least a second product container.

The invention also comprises a method for tracking an article disposed in a product container, comprising the steps of (i) providing at least a first product container having a plurality of container surfaces and containing at least a first article, (ii) providing a RFID tag assembly having at least one RFID tag that is disposed on at least a first surface of the container, the RFID tag assembly including a first substrate having first and second surfaces, and at least a first passive loop disposed on at least the first surface of the substrate, the first passive loop being adapted to receive at least a first RF signal and transmit at least a second RF signal in response to the first RF signal, the substrate and first passive loop being disposed on the first container surface proximate the RFID tag, the first passive loop being coupled to the RFID tag, (iii) providing at least a first RFID antenna system adapted to provide a first antenna field, the first RFID antenna system being adapted to transmit at least the first RF signal to the RFID tag and receive at least the second RF signal from the RFID tag, (iv) moving the first product container through the first antenna field, (v) transmitting the first RF signal from the antenna system while the RFID tag is moved through the antenna field, and (vi) receiving the second RF signal from the RFID tag.

Preferably, the RFID tag assembly includes a second substrate having first and second surfaces, the second substrate first surface being secured to the first surface of the container, the second substrate second surface being removeably secured to the first substrate second surface, wherein the RFID tag can be removed from the first product container and re-attached to at least the first article or a second product container.

BRIEF DESCRIPTION OF THE DRAWINGS

Further features and advantages will become apparent from the following and more particular description of the preferred embodiments of the invention, as illustrated in the accompanying drawings, and in which like referenced characters generally refer to the same parts or elements throughout the views, and in which.

DETAILED DESCRIPTION OF THE PREFERRED EMBODIMENT

In this invention, modular radio frequency identification device (RFID) antenna and tag systems are used to identify and track items throughout manufacture, warehouse storage, transportation, distribution and retail sale.

In a first embodiment, the invention is directed to the use of a modular RFID antenna system comprising a plurality of easy-to-assemble modular RFID antenna segments that can be connected in multiple configurations to allow omni-directional communication with at least one transponder or tag located on one or more items that pass through the field of the antenna system. The invention also includes the method of using a system, such as a computer system to design, order, configure, test and operate the modular RFID antenna systems for a given application.

Reference will now be made in detail to the preferred embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims.

Figure 1:
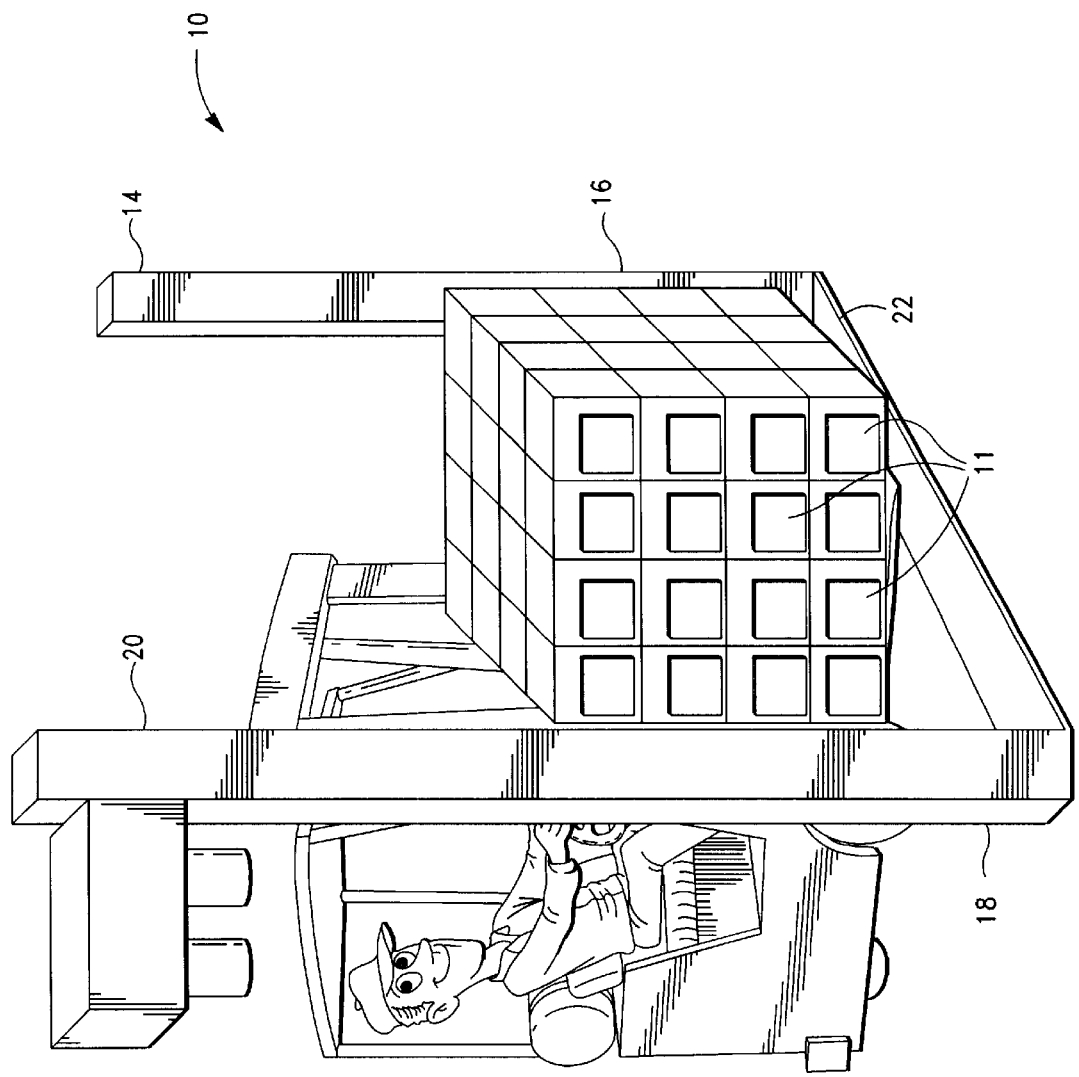
FIG. 1 is a schematic illustration of one embodiment of the modular RFID antenna system according to the invention.

Referring first to FIG. 1, there is shown one embodiment of an assembled RFID antenna system 10, according to the invention. As illustrated in FIG. 1, tags 11 located on multiple items or containers 12 pass through the field of antenna system 14. The system 14 comprises a plurality of modular antenna segments or panels 16, 18, 20 and 22 that are connected in a desired configuration to allow omni-directional communication with tags 11.

Figure 2:
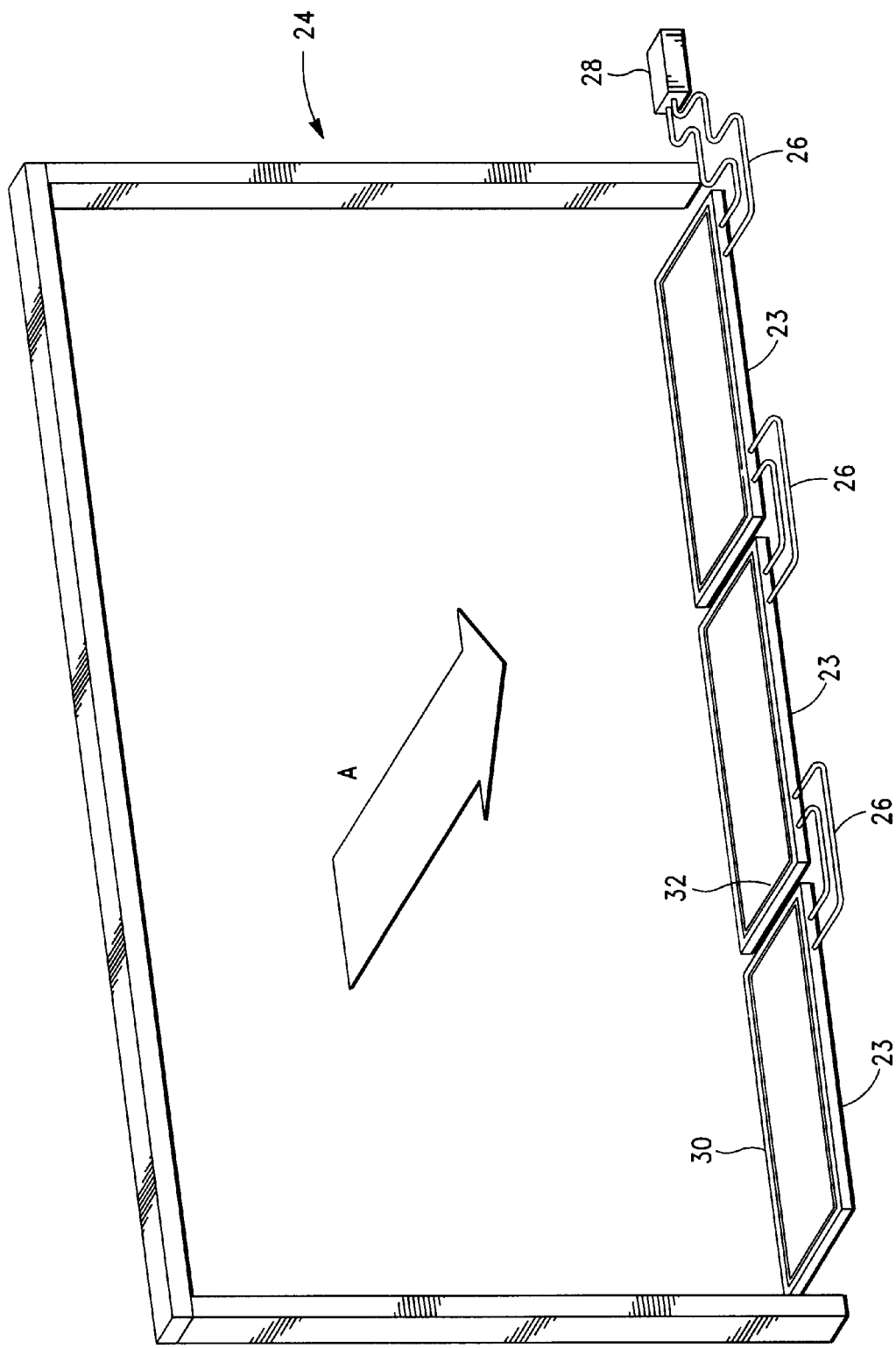
FIGS. 2–4 are schematic illustrations of additional embodiments of RFID antenna systems according to the invention.

Next, referring to FIG. 2, an antenna system 24 configuration adapted to ground or floor "pass-thru" applications is shown adapted for moving tags through in the direction of Arrow A. The system preferably includes a plurality of low-profile panels 23 disposed proximate the floor or ground of the structure (or building). The panels 23 are preferably in communication with each other via cable system 26.

However, in this and other referenced embodiments herein, the panels 23 can be employed separately. A controller 28 controls the operation of the panels 40. Also preferably, each panel 23 comprises modular elements 30 and 32 that can be chosen to create a panel having the desired characteristics.

Figure 3:
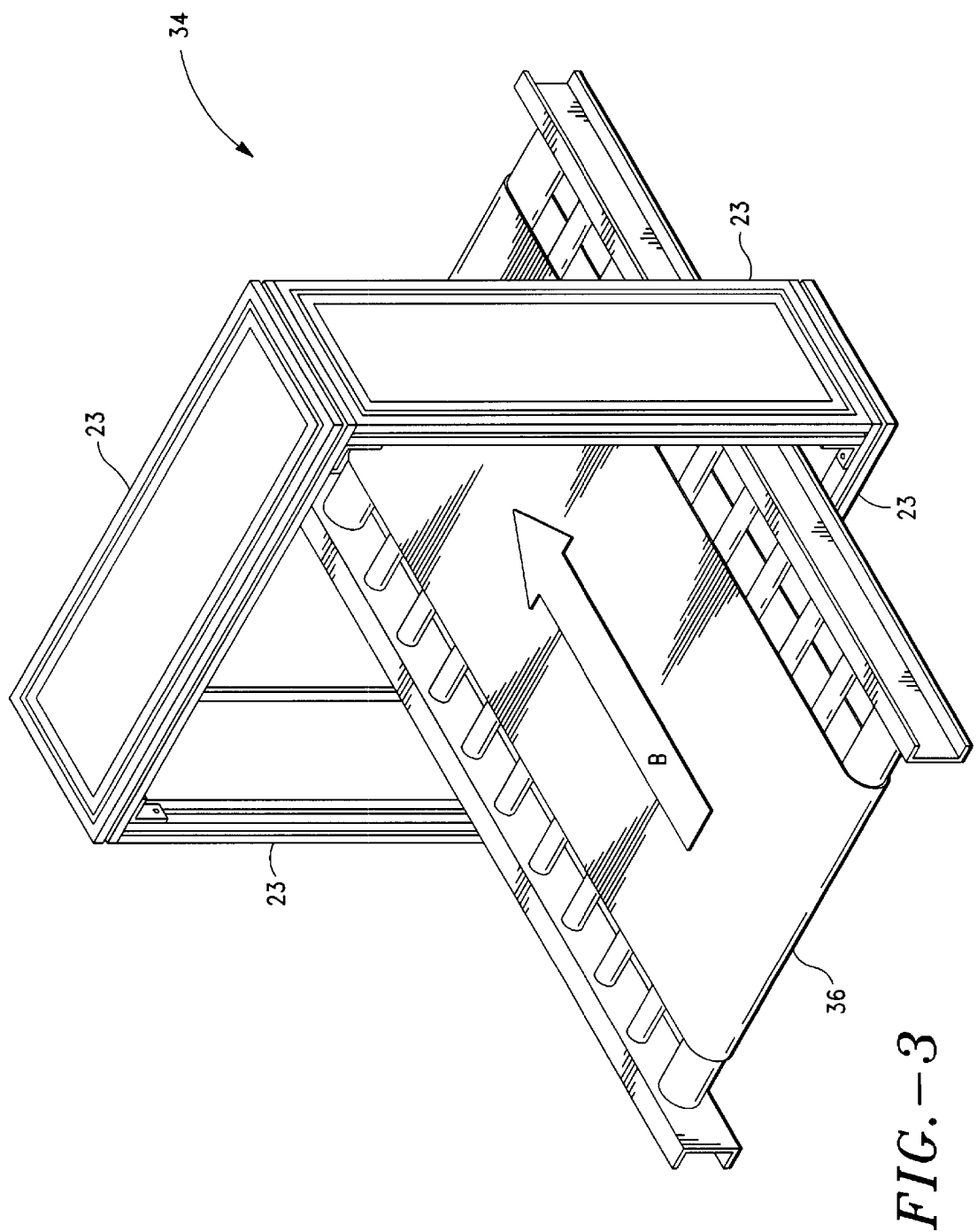

FIG. 3 shows a conveyor "pass-thru" or "gate" antenna system 34. The system 34 facilitates effective RF communication by and between the inter-connected antenna panels 23 and one or more tags that pass through the antenna field (via conveyor 36) in the direction denoted by Arrow B.

Figure 4:
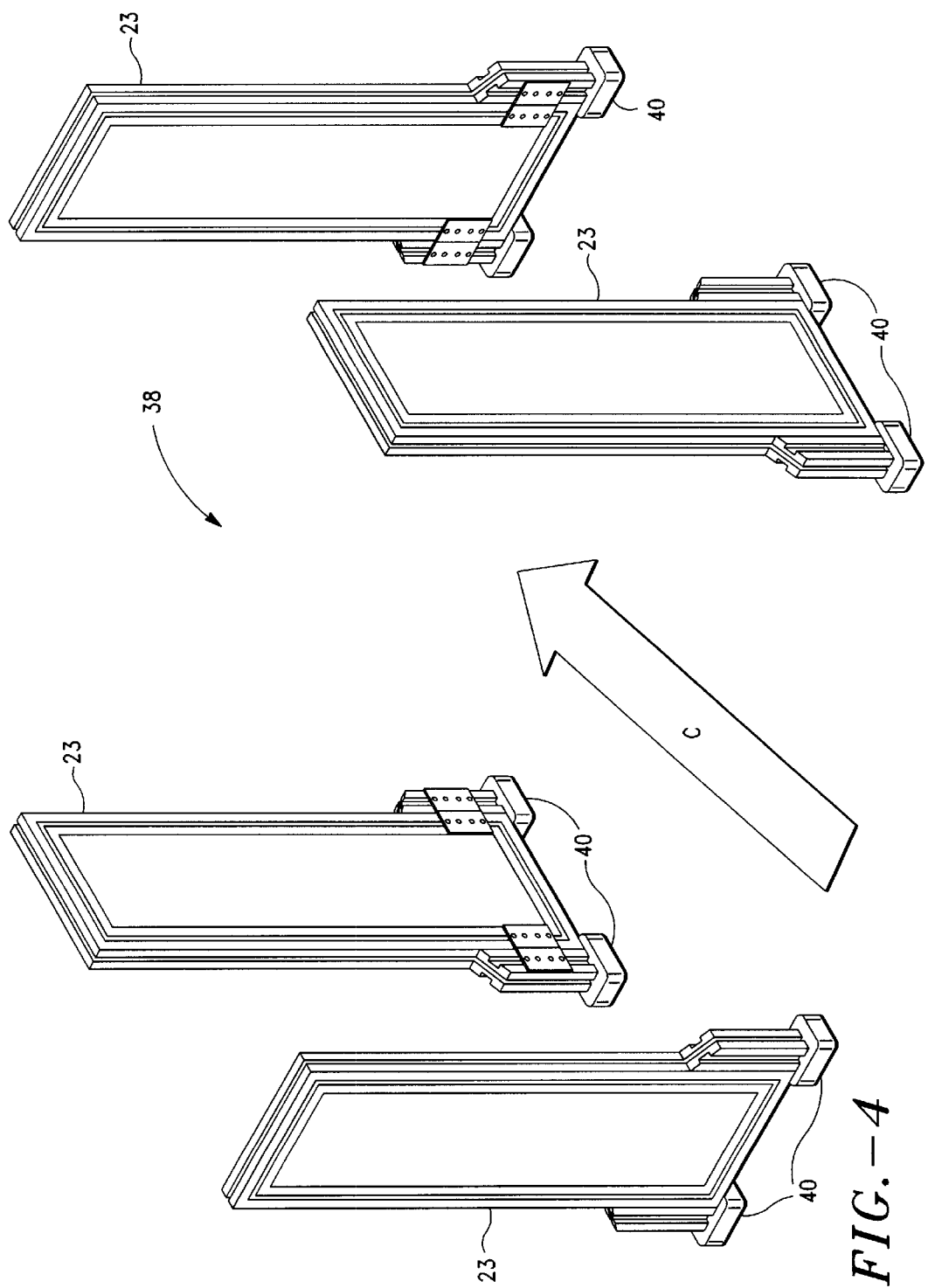

Referring to FIG. 4, antenna system 38 can be readily adapted to facilitate multiple paths (i.e., direction, width, etc.) through the antenna field(s), such as the path denoted by Arrow C. The system 38 can further be adapted to provide highly effective, omni-directional RF communication by and between the panels 23 and one or more tags within the antenna field(s). System 38 includes a plurality of low-profile panels 23 that are disposed in an upright position. The panels 23 are secured in the upright position and desired locations via supports 40. Alternatively, the panels may be stacked to provide additional flexibility in adapting the system 38 to facilitate multiple paths through the antenna fields.

To increase the read/write operating range of a RFID modular antenna system or configuration, the present invention includes the use of novel antenna-switching circuitry that allows adequate tag coverage at an increased range, while maintaining the radiation limits within those imposed by the FCC/CE. According to the invention, the driven antenna panels (e.g., 23) are switched on and off in an inverted manner at a rate that accommodates complete RF communication between the antenna panels and tags, while at the same time allowing for averaging or quasi-peak detection as allowed by the FCC/CE.

To achieve successful communication between a respective antenna panel and the tags, the transmitting antenna panel preferably continuously powers the passive tags. Once the tag is powered, a transmitter modulates the very field that powers the tag. The tag then communicates with the receiver via a separate receiving antenna while remaining powered by the transmit antenna.

Figure 5:
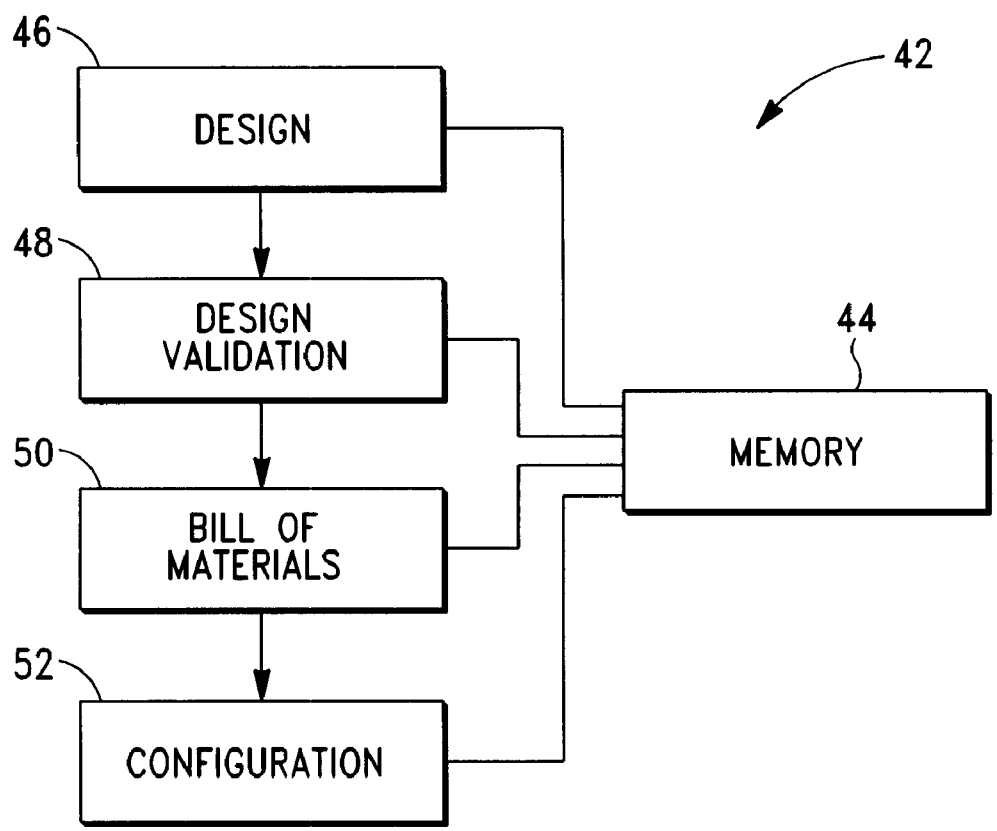
FIG. 5 is a schematic illustration of the configuration system modules according to the invention.

A key element of the present invention is the design and configuration of such systems using, for example, a computer having a PC—Windows® or Macintosh® based interface for design and configuration of a desired modular RFID antenna system. Referring to FIG. 5, a software component 42 preferably includes the following sub-systems or modules: memory 44, design 46, design validation 48, bill of materials 50, and configuration 52. Each sub-system is discussed in detail below.

Memory: Each sub-system is preferably in communication with the memory module or sub-system 44. According to the invention, the memory sub-system 44, includes at least the following databases or information: a plurality of available modular antenna systems, mechanical elements or parts for each antenna system, and set-up and operation parameters.

Design: According to the invention, the design sub-system 46 allows the user to select one or more of a plurality of available modular antenna systems. Such systems include the systems discussed above. After the desired system is selected, the design sub-system 46 then provides the user with a design menu that includes a parts list prompt that links the user to a parts list menu that provides list of mechanical elements or parts that are comparable with the selected system. Preferably, as discussed below, the design sub-system 46 further includes generating drawings.

Design Validation: According to the invention, the design validation sub-system 48 includes validating the selected antenna system and mechanical elements. In a preferred embodiment of the invention, if one or more of the selected mechanical elements are incorrect and/or incomparable with the selected antenna system, the design validation sub-system 48 will provide an error message and details relating thereto. The design validation sub-system 48 will further restrict the user from printing a bill of materials.

Bill of Materials: According to the invention, the bill of materials sub-system 50 generates a bill of materials. The bill of materials is preferably in tabular form and, as discussed in detail below, includes at least the following fields: line item fields, including supplier part number, part description, quantity, unit price and extended price; and global item fields, including customer name, address and other identifier information and (e.g., customer number), project name, P.O. number, shipping information and special instructions. The noted information is preferably provided in a printable format that can, if desired, be attached as an addendum to a purchase order.

In an additional envisioned embodiment of the invention, the bill of materials sub-system 50 also provides a bill of materials that is exportable via electronic media in formats that are compatible with the user's (or customer's) and supplier's (or vendor's) purchasing/receiving systems. As will be appreciated by one having ordinary skill in the art, the noted feature would facilitate E-commerce data/information transmission.

Configuration: An important sub-system of the software component is the configuration sub-system 52. According to the invention, the configuration sub-system 52 assembles, configures and controls the antenna system. Thus, the configuration sub-system 52 includes at least three (3) components: assembly, set-up and test. Preferably, these noted components are accessible via a configuration menu. According to the invention, the assembly component generates installation assembly drawings. The drawings can be selected automatically or manually from a set of predefined drawings (stored in memory module 44). The drawings are preferably provided in a format that is displayable and printable by the user. The files may also be exportable in Auto CAD formats. The set-up component provides the user with the necessary RF communication parameters. The set-up component thus includes at least the following: a plurality of baud rates, interface options (e.g., hardware protocols), operation mode (e.g., test or run) and read parameters (e.g., continuous, non-continuous, start address, etc.). The test component tests the assembled antenna system. The test component preferably provides a plurality of commands to verify the presence and operation health of a respective one and/or a plurality of the antenna panels.

Figure 6:
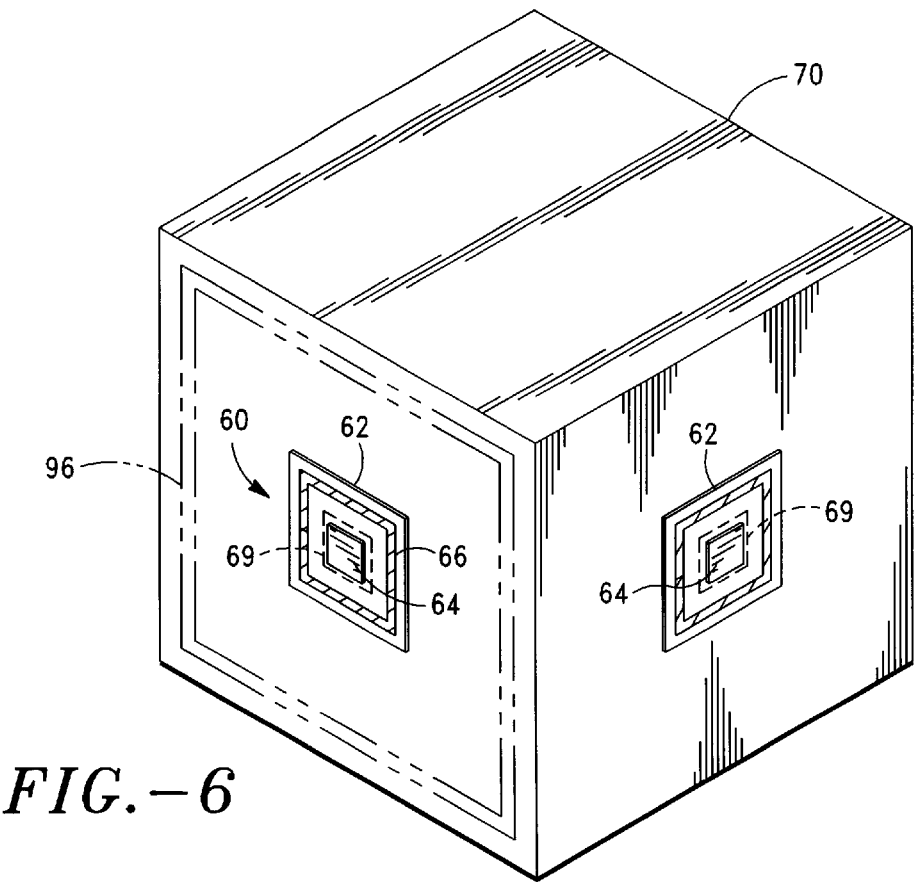
FIG. 6 is a perspective view of one embodiment of the RFID tag system according to the invention.

The methods of the invention also include using RFID tags having passive loops, preferably in conjunction with antenna systems such as the ones disclosed above. Referring now to FIG. 6, there is shown a first embodiment of the RFID tag assembly 60 useful in the practice of the invention. Tag assembly 60 includes a substrate 62, a conventional RFID tag 64 and at least one conductive member (i.e., antenna), such as a passive loop or dipole 66, adapted to transmit and receive RFID signals. As discussed in detail below, the tag 64 and passive loop 66 are preferably disposed on at least one surface or portion of the substrate 62. In a preferred embodiment, the tag 64 is disposed in the interior region defined by the loop 66 (hereinafter referred to as the "loop region") or otherwise proximate to loop 66.

To facilitate attachment of the substrate 62 to a shipping container 68 or other article, the substrate 62 preferably includes conventional adhesive means (e.g., two sided tape) disposed on at least one surface or portion of the substrate 62, more preferably, on a surface opposite of the tag 64 and passive loop 66. According to the invention, the substrate 62 can also be secured or directly bonded to a container or other article via conventional adhesives (e.g.,epoxy) or conventional mechanical means.

The substrates useful in the practice of the invention include various non-conductive materials, such as paper, synthetic paper, cardboard, polyamide, polyester, Teflon™, ABS™, and like materials, or a material having a non-conductive area comprising the noted materials. In a preferred embodiment of the invention, the substrate comprises paper.

According to the invention, the passive loop 66 is in communication with (i.e., coupled to) the tag 64. As will be appreciated by one having ordinary skill in the art, the loop 66 can be coupled to the tag 64 by various conventional means. In a preferred embodiment of the invention, the loop 66 is magnetically coupled to the tag 64. The passive loop 66 can comprise various sizes and configurations, such as the substantially square shaped loop shown in FIGS. 6 and 7. The loop 66 can also be substantially larger than the tag 64 and, hence, is merely limited by the size of the substrate 62.

The passive loop 66 can also be constructed from various conductive materials that can be applied to or embedded in the substrate 62 by conventional means. For example, the passive loop 66 can comprise a carbon/graphite bearing conductive ink that is printed or silk-screened on the substrate 62, comprise a metalized paint directly applied to the substrate 30, a substantially metalized or metallic foil (or wire) bonded to the substrate 62 or a foil or wire embedded in the substrate 62. In a preferred embodiment of the invention, the passive loop 66 comprises a copper foil that is bonded to the substrate 62 by conventional means.

As will be appreciated by one having ordinary skill in the art, virtually all conventional RFID tags (e.g., 2.45 GHz, 125 KHz, 13.5 MHz, 900 MHz) can be employed within the scope of the present invention. Such tags are described in numerous prior art references, including U.S. Pat. Nos. 6,121,878; 6,118,379; and 6,100,804, which are incorporated by reference herein.

According to the invention, the passive loop 66 has an inductance and a capacitance that is tuned to or close to the operating frequency of the respective tag 64. In additional envisioned embodiments of the invention, the passive loop 66 has a distributed capacitance, or a combination of fixed and distributed capacitance that is tuned to or close to the operating frequency of the tag 64.

Preferably, the use of the tag system 60 of the invention includes removing tag 64 from substrate 62 and securing to an article, such as a product 68 or product container 70. Thus, information and data acquired during packaging, inventory or transport remains with the article through subsequence processes or use. As will be appreciated by one having ordinary skill in the art, the article can be a product or item contained in a larger shipping container, a product container transported in a larger container (e.g., shipping container), or a product container transported on a pallet. Thus, tag 64 is preferably detachable from the substrate 62. As will be appreciated by one having ordinary skill in the art, various methods may be employed to facilitate the detachment of the tag 64 from the substrate 62. In one embodiment of the invention, the substrate 62 includes a substantially continuous line of perforations 69 disposed proximate the tag 64. Accordingly, the separable substrate section or tag assembly preferably includes conventional adhesive means on the rear portion thereof for subsequent attachment of the tag 64 to a product 68, container 70 or other desired article (discussed in detailed below). However, as will be appreciated by one having ordinary skill in the art, the tag assembly 60 can also be attached to a product or other article by mechanical means.

Figure 7:
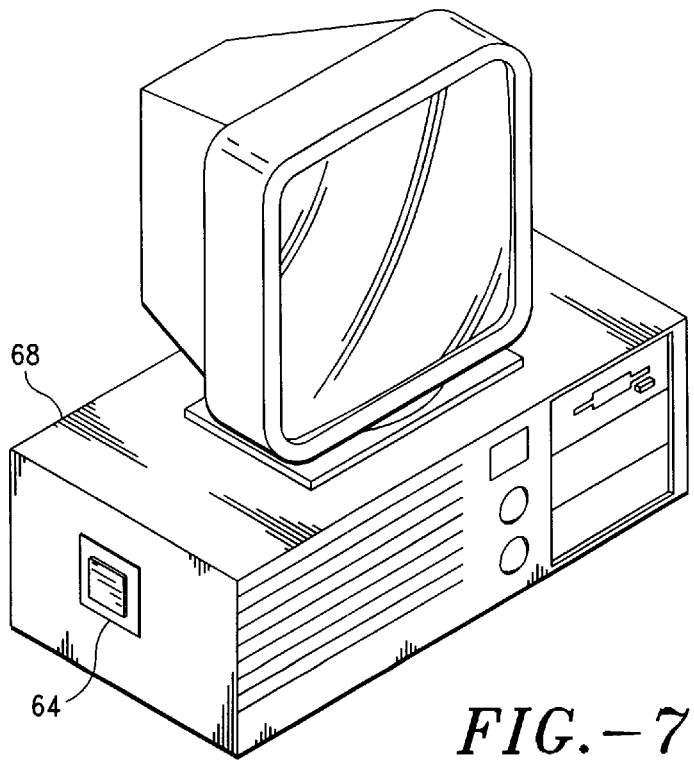
FIG. 7 is a perspective view of an article having a removable RFID tag thereon according to the invention.

In use, tag system 60 is initially attached to shipping container 70. When the product 68, such as the computer illustrated in FIG. 7, is removed from the shipping container 70, the tag 64 is removed from the substrate 62 and placed on the product 68. Thus, any data or information acquired while the product 68 is in the shipping container 70 remains with the product 68 throughout its lifetime.

Figure 8:
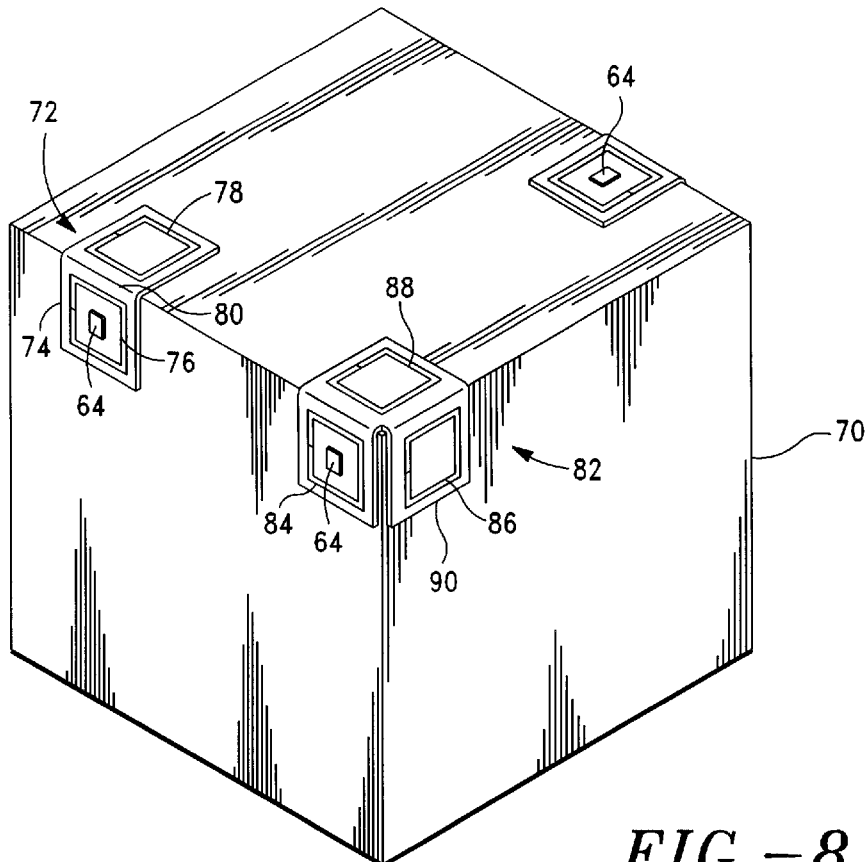
FIG. 8 is a perspective view of a further embodiment of the RFID tag assembly according to the invention.

Referring now to FIG. 8, additional embodiments of RFID tag systems may be used with the invention. In addition to increasing the operating range of the tags 64 associated therewith, the noted embodiments substantially reduce the orientation sensitivity that is commonly associated with the tags 64. For example, tag system 72 comprises a substantially planar substrate 74 having at least one tag 64 with associated first passive loop 76 and at least a second passive loop 78 disposed thereon. The first and second passive loops 76 and 78 are preferably disposed on opposing ends of the substrate 74 and are preferably in communication with each other. Also preferably, substrate 74 preferably includes a fold line 80 that facilitates folding of the substrate 74 into a substantially "L" shaped configuration so that it may be attached to an edge of shipping container 70 to facilitate optimal transmission and receipt of RF signals in at least two planes. Two or more tag systems 72 can also be employed within the scope of the invention (i.e., disposed on different edges of the container 70) to further reduce the orientation sensitivity of the tags 64 and, hence, RFID system. Similarly, tag system 82 may comprise tag 64 with first passive loop 84 and two additional passive loops 86 and 88 disposed on a "multi-panel" substrate 90. The "multi-panel" substrate 90 is flexible enough to be bent allowing it to be attached to a corner of product container 70 to facilitate optimal transmission and receipt of RF signals in at least three planes.

The methods of the invention further include the use of a RFID passive repeater system comprising one or more passive loops (i.e., antenna means) preferably disposed on a larger member that significantly enhances the operating range of individual tags positioned proximate a respective passive loop. As will be appreciated by one having ordinary skill in the art, the invention is particularly useful in applications where multiple items are grouped together into a larger package, shipping unit, load, or other grouping of tagged items and need to be read at a distance greater than that which would be allowed by the relatively smaller size of the individually tagged items. Examples would be a pallet of boxes or items, a cart or bin or tote used to contain multiple items, a large box or packaging containing multiple small items, a shipping container with multiple tagged items, or as a method of extending the read/write range between an RFID reader/writer and a designated tag.

The implementation of the passive repeater systems may be one large loop (with suitable resonating capacitance) coupled directly to an RFID tag 64, or as two or three resonant loops coupled magnetically to another loop in order to collect the energy from two or more resonant loops and convey it back to the RFID tag 64. As discussed above, the coupling mechanism for this collection loop into the RFID chip 64 may be by direct connection, or through magnetic coupling into another resonant loop directly attached to RFID tag.

Figure 9:
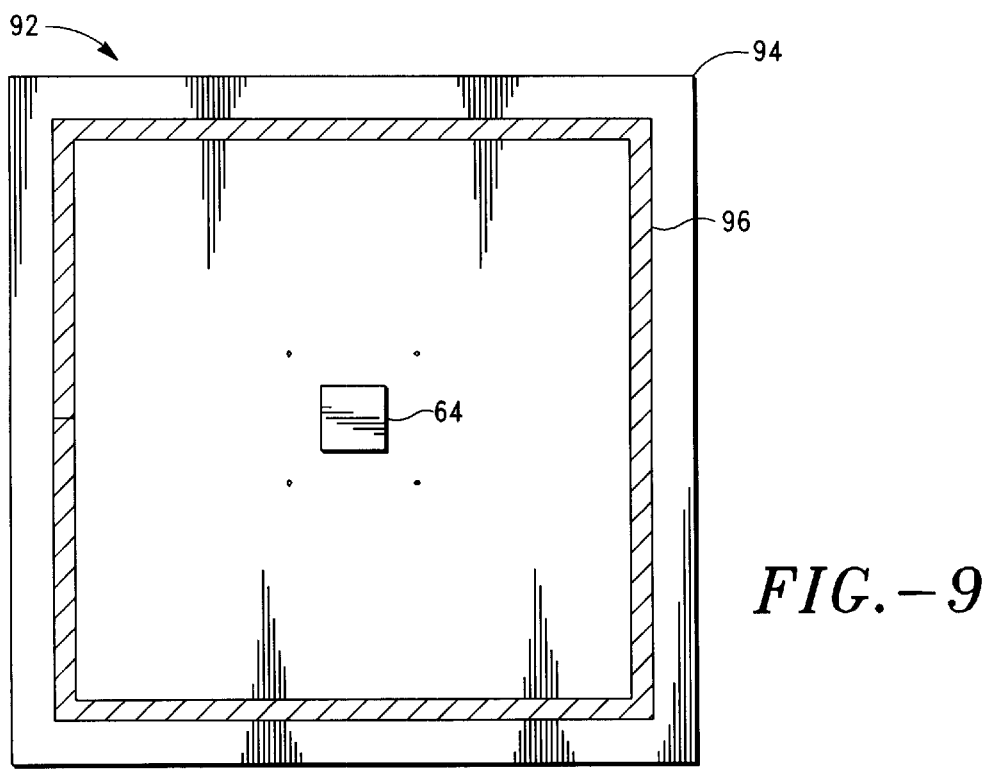
FIG. 9 is a plan view of one embodiment of the passive repeater apparatus accordingly to the invention.

As shown in FIG. 9, passive repeater system 92 includes a substrate 94 having first and second surfaces, a conventional RFID tag 64 and at least one passive conductive member or loop 96 adapted to transmit and receive RFID signals. Alternatively, as shown in FIG. 6, loop 96 may be used with tag system 60, or other suitable RFID tag systems. According to the invention, the loop 96 is in communication with (i.e., coupled to) the tag 64. Tag 64 is preferably disposed on a surface of the substrate 94 proximate the loop 96 and is in communication therewith. According to these embodiments of the invention, the maximum distance from the tag 64 to a point on the loop 96 (designated by Arrow D) is approximately 20 ft, more preferably, the maximum distance is approximately 15 ft. In a preferred embodiment of the invention, the maximum distance (D) from the tag 64 to the loop 96 is in the range of approximately 8–12 ft.

According to the invention, the passive loop 96 can comprise various configurations and conductive materials that can be produced, applied to or embedded in the substrate 94 in various manners. For example, the loop 96 can be silk-screened on the substrate 94, comprise a metalized paint directly applied to the substrate 94, a substantially metalized or metallic foil bonded to the substrate 94 or a foil embedded in the substrate 94. In a preferred embodiment of the invention, the loop 96 comprises a copper foil that is bonded to a surface of the substrate 94 by conventional means. In additional envisioned embodiments of the invention, two or more passive loops are employed, preferably bonded to one surface or side of a substrate with an insulating layer disposed therebetween.

According to the invention, the passive loop 96 preferably have an inductance and a capacitance that is tuned to or close to the operating frequency of the respective tag(s) 64 (e.g., common ISM bands). In additional envisioned embodiments of the invention, the loop 96 has distributed capacitance, or a combination of fixed and distributed capacitance that is tuned to or close to the operating frequency of the respective tag(s) 64.

Applicant has found that effective enhancement of RFID signals can be achieved with a passive repeater system having a loop region area in the range of approximately 1.0 sq. in. to 400 sq. ft.

Figure 10:
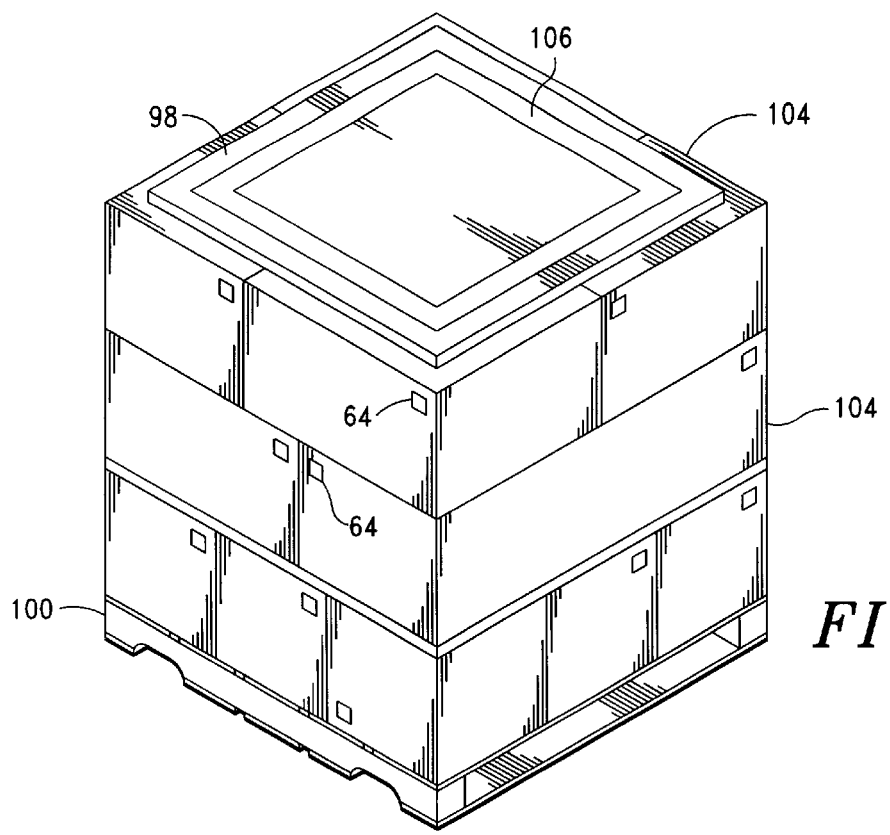
FIG. 10 is a perspective view of an additional embodiment of the passive repeater system according to the invention.
Figure 11:
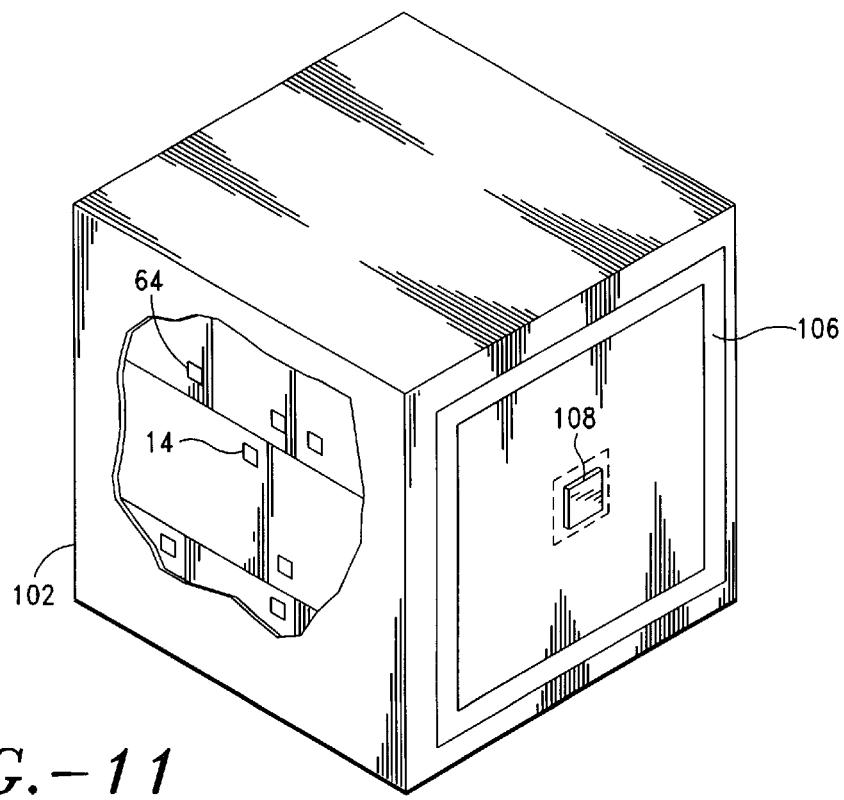
FIG. 11 is a perspective view of a further embodiment of the passive repeater system, illustrating a passive repeater "container" system according to the invention.

As illustrated in FIGS. 10 and 11, passive repeater system 98 is preferably disposed proximate a single tag 64, a group of tags, or placed within an aggregate grouping of items containing tags 64 or placed on or built into a unit load device (ULD) used to group, contain, hold, transport, or otherwise group for storage, transport, or delivery a group of items that are tagged, such as shipping pallet 100 or container 102. According to the invention, the passive repeater system 98 is preferably magnetically coupled to the tag(s) 64. Passive repeater system 98 may be substantially planar, or may be configured to define two or three planes to optimize RF performance.

FIG. 10 shows passive repeater system 98 used with palletized group of boxes 104. In the noted embodiments, the passive repeater system 98 is disposed on top of the boxes and/or within the group of boxes. Alternatively, passive repeater system 98 may be embedded in the pallet 100. FIG. 11 shows passive repeater system 98 used with container 102 having at least one box 104. The passive loop 106 of passive repeater system 98 may be disposed on or embedded in one surface of container 102. In an additional embodiment of the invention, discussed below, the passive repeater system 98 further comprises an RFID tag 108 preferably disposed on an outer surface of the container 102 proximate the passive loop 106 to allow separate identification and tracking of the container 102 separate from the group of boxes 104.

Figure 12:
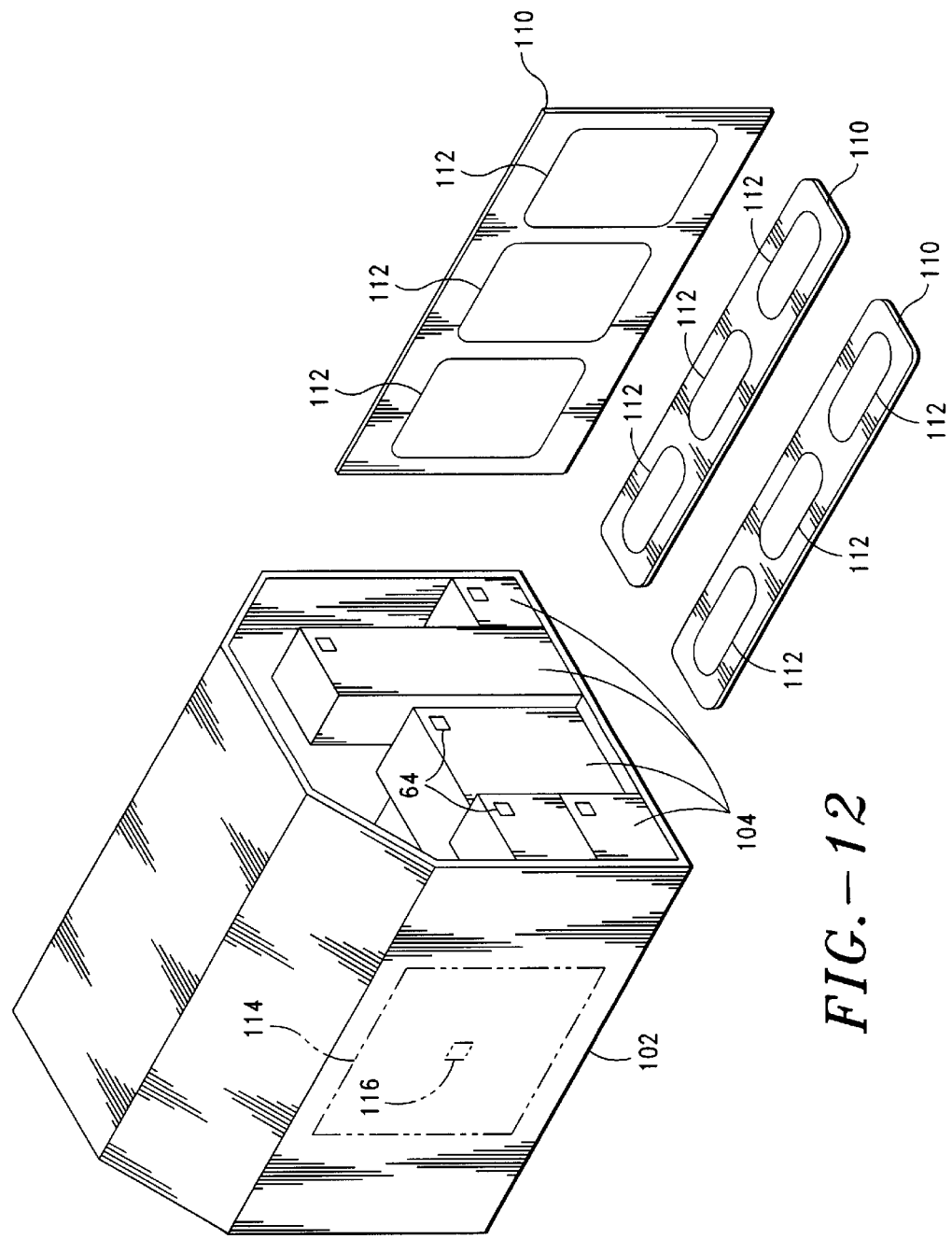
FIG. 12 is a perspective view of yet a further embodiment of the passive repeater system, illustrating a passive repeater "shipping container" system according to the invention.

FIG. 12 shows a passive repeater system 98 comprising at least one substantially elongated panel 110 having at least one passive loop 112 thereon that is positioned in a shipping container 102 with packages 104. According to the invention, the panel 110 is preferably constructed of plastic, cardboard, wood and other like materials, and can comprise various shapes and sizes. In these embodiments, passive repeater system 98 would have a loop region area in the range of approximately 1.0 sq. in. to 400 sq. ft. In a preferred embodiment of the invention, the loop region area is in the range of approximately 0.25 sq. ft to 100 sq. ft.

In further envisioned embodiments of the invention, an additional passive loop, such as passive loop 114 shown in phantom in FIG. 12, is employed with coils magnetically or electrically coupled to at least one internally disposed panel 110. According to the invention, the RF field at or around the frequency of operation of the RFID system is translated from the area outside of the shipping container 102 where the RFID equipment is located to the inside of the container 102 where the panel 110 is positioned to further enhance communication with the tags 64 on boxes 104 inside the shipping container 102. Also, a separate tag 116 may be disposed proximate to passive loop 114 to acquire and store information about the container 102 and/or it's contents. Information such as the container contents, serial number, origin and destination points, transport identification (e.g., flight number), tracking number for the entire shipment and/or any data related to the container 102 can thus be readily accessed at one convenient point.

Figure 13:
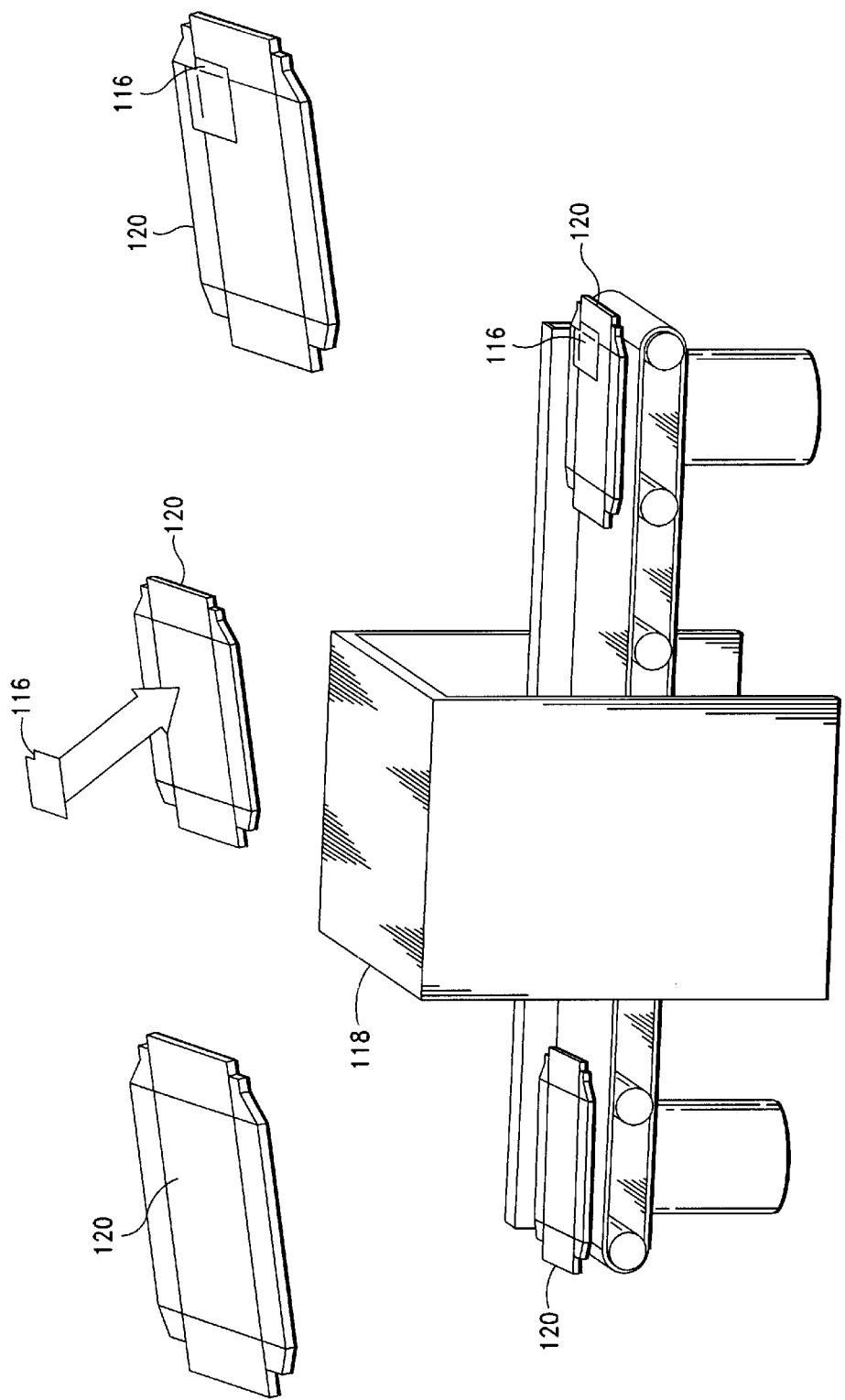
FIGS. 13 and 14 are schematic views of an applicator for integrating RFID labels with containers according to the invention.
Figure 14:
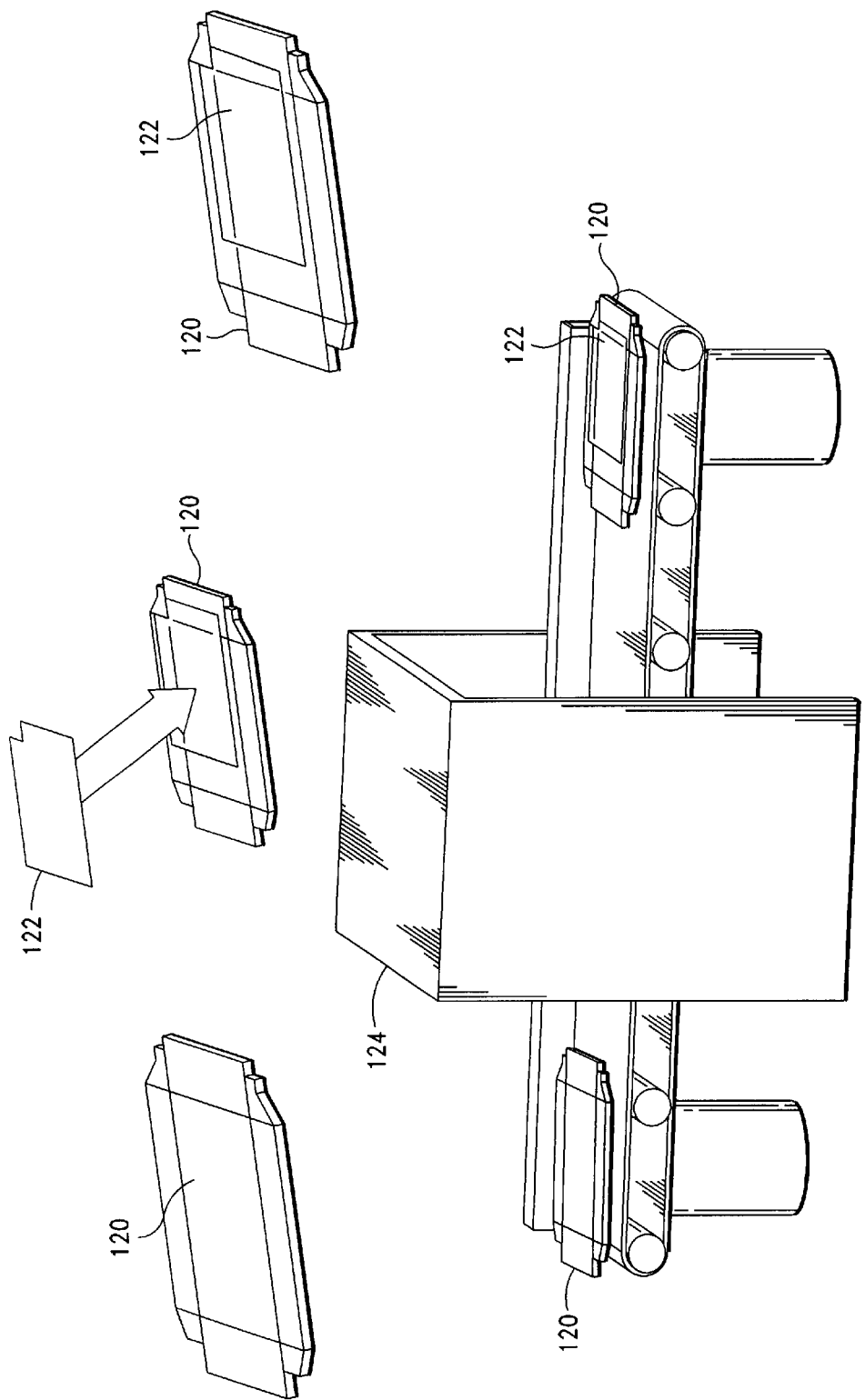

Yet another embodiment of the invention is directed to the use of cartons having integrated RFID tags and the related methods of integrating RFID tags with such cartons. For example, FIG. 13 shows the process of adding an RFID tag comprising a label 116 that is affixed by applicator 118 to collapsed cartons 120. Preferably, the label 116 is attached so that when the carton 120 expanded by folding upright, the label adopts a three dimensional shape that optimizes its RF performance. Alternatively, as shown in FIG. 14, RFID tag 122 is embedded into carton 120 by applicator 124. Again, preferably when carton 120 is folded into its useful shape, tag 122 assumes a three dimensional conformation.

Figure 15:
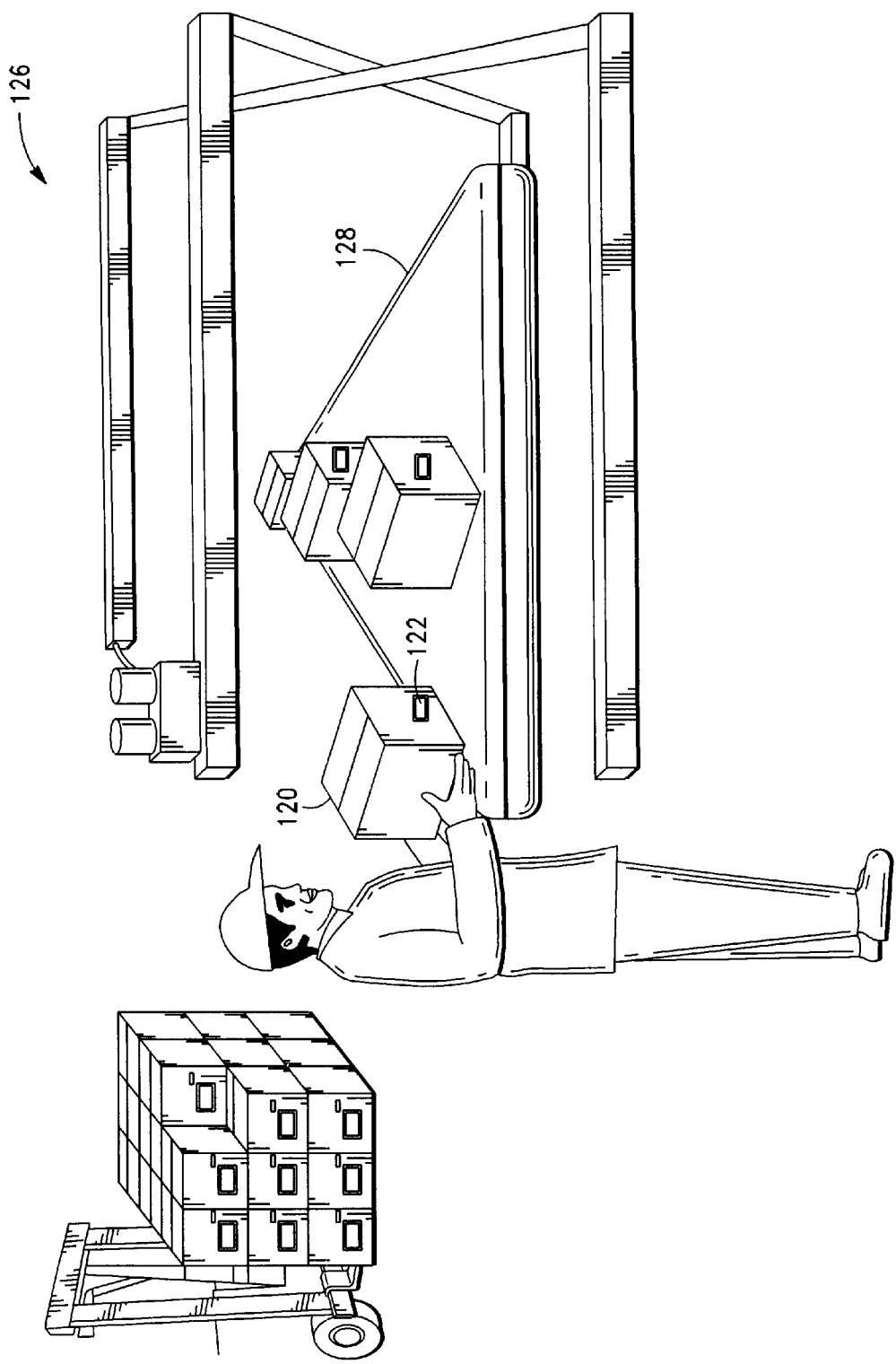
FIG. 15 is a schematic view of a method of the invention comprising communicating with an RFID label using a three dimensional antenna.

Alternatively, labels 116 or tags 122 can be affixed or embedded into cartons 120 that assume a one dimensional conformation. In such embodiments, it is preferably to utilize antenna systems having a three dimensional field, such as system 126 used with conveyor 128 in FIG. 15.

The methods of using the disclosed antenna and RFID tag systems offers superior identification and tracking of goods through all aspects of manufacture, storage, transportation, distribution and sale. One example of the method, without limiting the applicability of the invention, is a delivery company tracking packages for shipment. The delivery company can provide customers with cartons 120 having affixed or embedded labels 116 or 122. The customer then expands the boxes and uses them to package goods for delivery. Optionally, the customer can take advantage of the RFID tags on the cartons to track and identify the goods in-house. The delivery company picks up the carton 120, and by using pass-through antennas or other suitable antennas, can read and write information to the carton at the time of pick up. The carton can then be tracked throughout the entire shipping process, including for example, transportation to local distribution warehouses, storage there, collection into shipping containers or other ULDs, transportation to destination warehouses, storage there, local transportation to the destination, and drop-off to recipient. Preferably, passive repeaters and additional RFID tags can be used to identify and track aggregate collections of cartons 120. Also optionally, the recipient can utilize the RFID tagged cartons to maintain inventory and tracking. One of skill in the art will recognize this is particularly advantageous when the recipient engages in retail or wholesale sales of goods supplied by the customer. Further, the delivery company can use the cartons with integrated RFID tags for advertising, as the carton will be used throughout the manufacture, delivery and distribution chain as described above.

Figure 16:
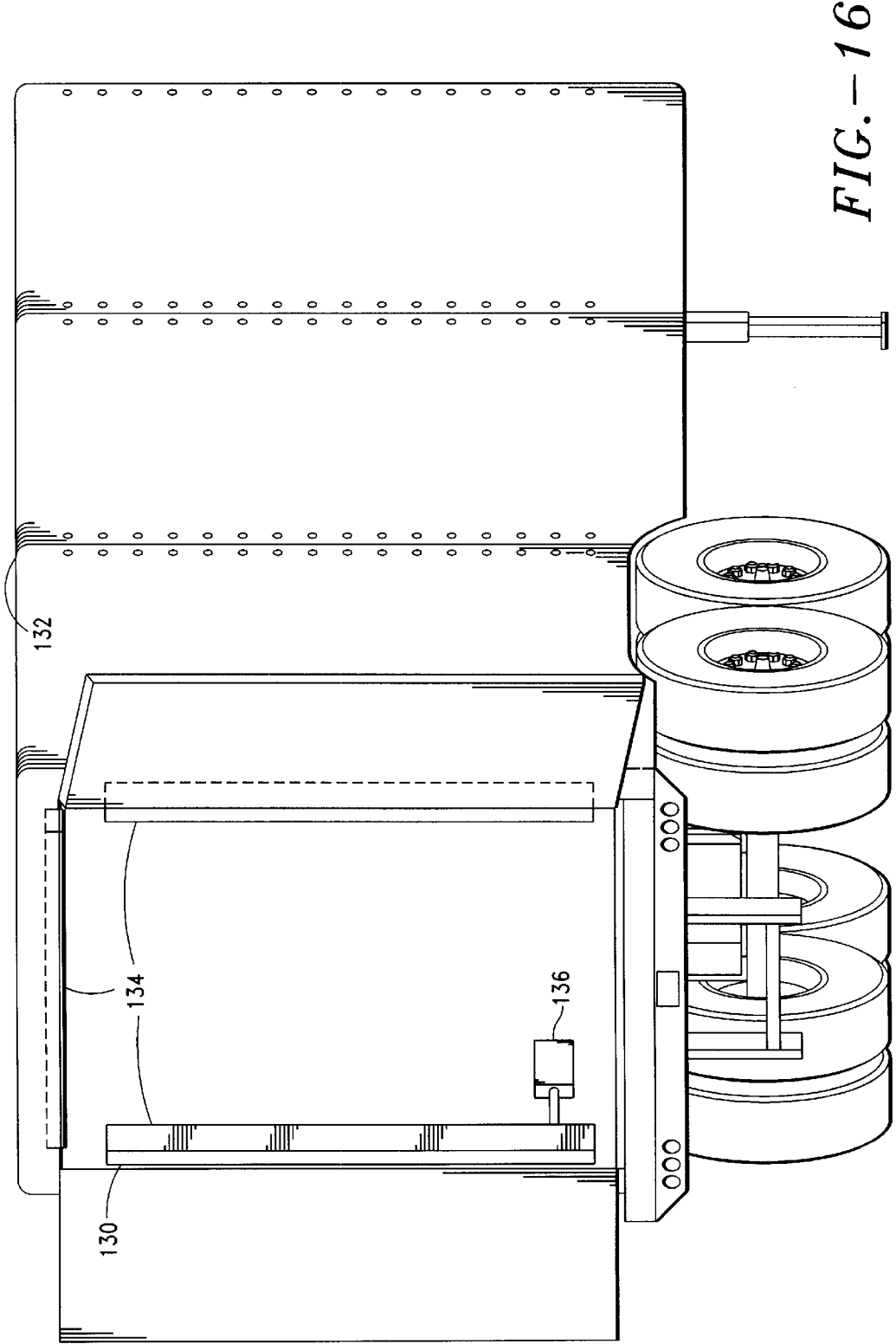
FIG. 16 is a schematic view of an RFID antenna system of the invention retrofitted to a trailer.

An additional embodiment of the invention is shown in FIG. 16, wherein a modular RFID antenna system 130 of the invention is retrofitted into a trailer 132 for use with a conventional tractor-trailer. In a preferred embodiment of the invention, the antenna system 130 comprises modular antenna segments 134, as described above, and is powered by external battery 136. In an additional envisioned embodiment of the invention, the antenna system 130 is powered by the electrical or battery system of the tractor-trailer.

Figure 17:
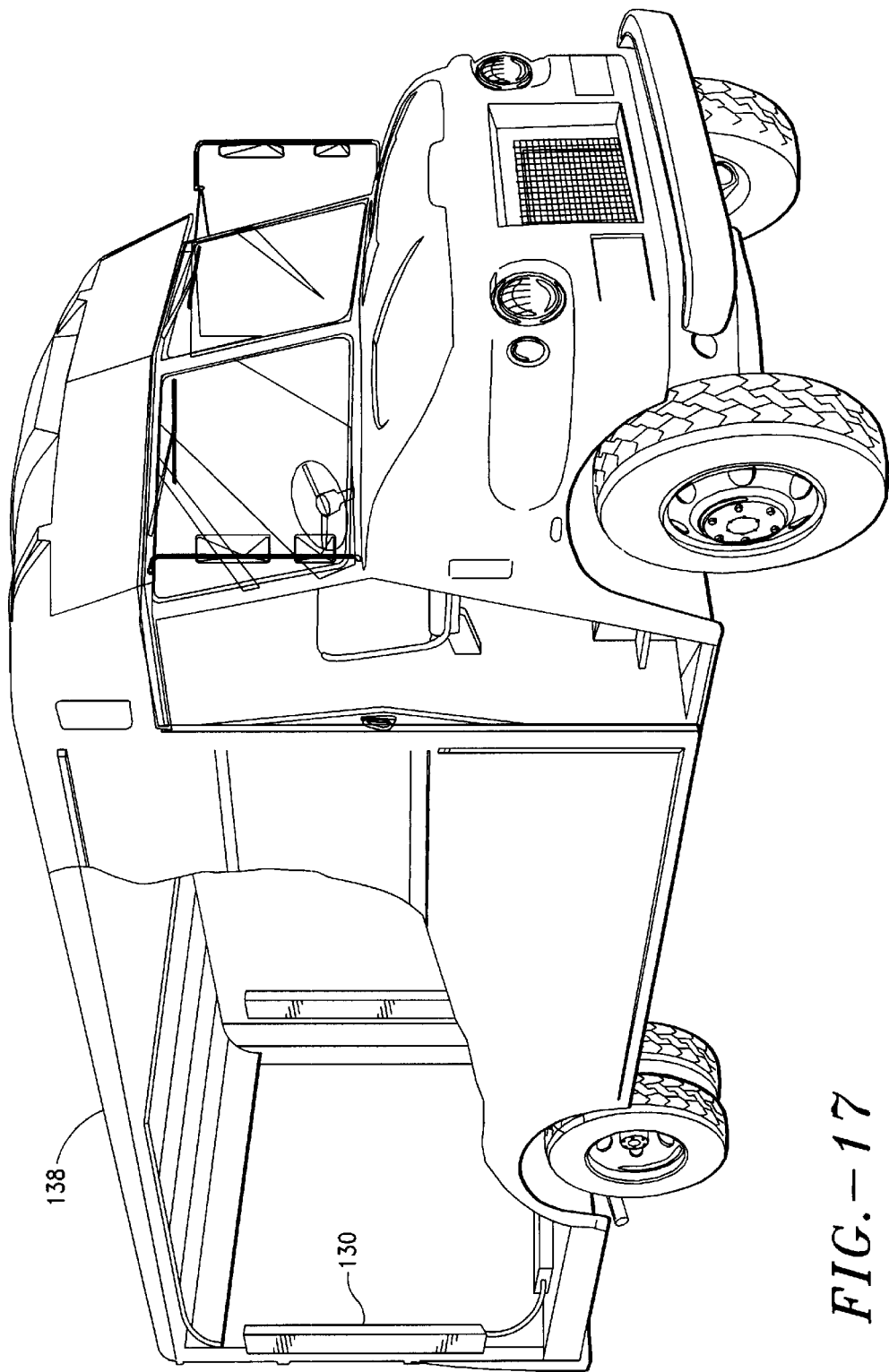
FIG. 17 is a schematic view of an RFID antenna system of the invention retrofitted to a cargo truck.
Figure 18:
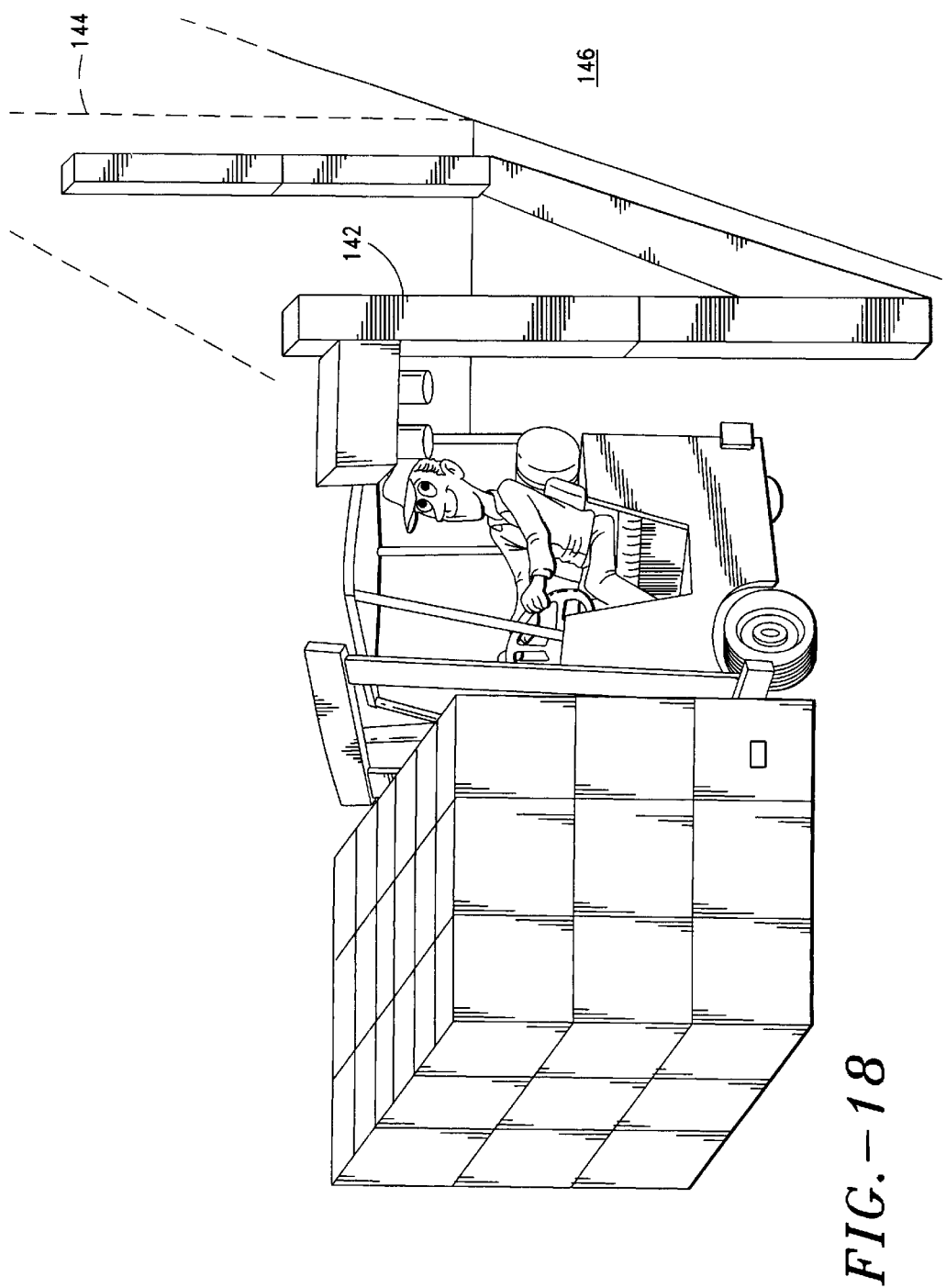
FIG. 18 is a schematic view of an RFID antenna system of the invention placed at then access to a loading dock.

Referring now to FIG. 17, the modular RFID antenna system 130 can also be retrofitted into a cargo truck 138. In this embodiment, the antenna system 130 is preferably powered by an existing vehicle battery 140.

In the embodiments shown in FIGS. 16 and 17, the antenna system 130 communicates with items having RFID tags as they are loaded to and unloaded from trailer 132 or truck 138, allowing accurate tracking of tagged items throughout the transport chain. In addition to trailers or trucks, the system can be used with any suitable transport vehicle.

In yet another embodiment of the invention, a modular RFID antenna system 142 of the invention is installed at entrance to a building or warehouse 144, such as at loading dock 146. Utilizing such systems allows tracking of RFID tagged items when they are stored on a loading dock, for example, prior to warehousing or loading onto a transport device. Similarly, the positioning of antenna system 142 adjacent the entrance of a building or warehouse ensures that RFID tagged items will be tracked whenever it leaves or enters the building.

Without departing from the spirit and scope of this invention, one of ordinary skill can make various changes and modifications to the invention to adapt it to various usages and conditions. As such, these changes and modifications are properly, equitably, and intended to be, within the full range of equivalence of the following claims.

What is claimed is:

1. A method for communicating with an RFID tag, comprising the steps of:
   providing a passive loop modular antenna system, said modular antenna system comprising a plurality of modular antenna segments adapted to transmit at least a first RF signal to said RFID tag and receive at least a second RF signal from said RFID tag, said antenna segments being removeably connectable to form a plurality of antenna system configurations, at least a first of said plurality of antenna system configurations providing an antenna field, said antenna field providing substantially multi-directional RF transmission of said first RF signal and receipt of said second RF signal;
   moving said RFID tag through said antenna field;
   transmitting said first RF signal from said modular antenna system while said RFID tag is moved through said antenna field; and
   receiving said second RF signal from said RFID tag.

2. The method of claim 1, wherein said RFID tag is disposed on a product container.

3. The method of claim 2, including the step of providing configuration means, said configuration means including at least design means for designing at least a first one of said plurality of antenna system configurations, design validation means to validate said design of said first antenna system configuration, and configuration means for providing at least one assembly drawing and the control parameters for said first antenna system configuration.

4. A method for communicating with at least one RFID tag, comprising the steps of:
   providing a RFID reader adapted to provide a magnetic flux field;
   providing at least one RFID tag, said RFID tag being disposed on at least a first product container;
   providing at least one passive repeater member, said passive repeater member including at least a first substantially continuous passive loop, said first passive loop being adapted and positionable with respect to said RFID reader and said RFID tag to couple said RFID reader and said RFID tag, said passive repeater member being adapted and positionable with respect to said RFID reader and said RFID tag to redirect said magnetic flux field;
   providing said magnetic flux field; and
   moving said first product container through said magnetic flux field.

5. The method of claim 4, wherein said passive repeater member extends the range of said magnetic flux field.

6. The method of claim 4, said passive repeater member is disposed within a plurality of product containers.

7. The method of claim 4, wherein said passive repeater member is disposed proximate transport means.

8. The method of claim 4, wherein said RFID tag is removeably attached to said first product container, said RFID tag being further adapted to be removed from said first product container and re-attached to at least a second product container.

9. The method of claim 4, including the step of providing a second passive repeater member, said second passive repeater member including a second passive loop, said second passive loop being adapted and positionable with respect to said first passive loop, said RFID reader and said RFID tag to couple said RFID reader and said a RFID tag.

10. The method of claim 9, wherein the first and second passive loops are in substantially different planes.

11. A method of tracking an article disposed in a product container, comprising the steps of:
   providing at least a first product container having a plurality of container surfaces, said first product container having at least a first article contained therein;
   providing a RFID tag assembly having at least one RFID tag, said RFID tag being disposed on at least a first surface of said plurality of first product container surfaces, said RFID tag assembly including a first substrate having first and second surfaces, and at least a first passive loop disposed on at least said first surface of said substrate, said first passive loop being adapted to receive at least a first RF signal and transmit at least a second RF signal in response to said first RF signal, said substrate and first passive loop being disposed on said first container surface proximate said RFID tag, said first passive loop being coupled to said RFID tag;
   providing at least a first RFID antenna system adapted to provide a first antenna field, said first RFID antenna system being adapted to transmit at least said first RF signal to said RFID tag and receive at least said second RF signal from said RFID tag;

moving said product container through said first antenna field;

transmitting said first RF signal from said antenna system while said RFID tag is moved through said antenna field; and receiving said second RF signal from said RFID tag.

12. The method of claim 11, wherein said tag assembly includes at least a second passive loop disposed on at least a second surface of said plurality of first product container surfaces, said second passive loop being in communication with said first passive loop.

13. The method of claim 11, wherein said antenna system comprises a modular antenna system.

14. The method of claim 13, wherein said modular antenna system includes a plurality of modular antenna segments adapted to transmit said first RF signal and receive said second RF signal.

15. The method of claim 11, wherein said antenna system includes at least one passive repeater member.

16. The method of claim 15, wherein said passive repeater member includes at least one substantially continuous passive loop, said passive repeater member passive loop being adapted to redirect said first and second RF signals.

17. The method of claim 11, wherein said RFID tag assembly includes a second substrate having first and second surfaces, said second substrate first surface being secured to said first surface of said plurality of first product container surfaces, said second substrate second surface being removeably secured to said first substrate second surface, wherein said RFID tag can be removed from said first product container and re-attached to at least said first article.

18. The method of claim 17, wherein said first article comprises a product.

19. The method of claim 17, wherein said first article comprises a second product container.

20. The method of claim 17, including the steps of:
a) providing a second antenna system adapted to provide a second antenna field, said antenna system being adapted to transmit at least a third RF signal and receive a fourth RF signal,
b) removing said RFID tag from said first product container,
c) re-attaching said RFID tag to said first article,
d) moving said first article through said second antenna field,
e) transmitting said third RF signal to said RFID tag, and
f) receiving said fourth RF signal from said RFID tag.

* * * * *